(12) United States Patent
Noldus

(10) Patent No.: US 10,080,157 B2
(45) Date of Patent: Sep. 18, 2018

(54) APPARATUS AND METHOD FOR CONTROLLING CONGESTION IN A CELL OF A MOBILE COMMUNICATIONS NETWORK

(71) Applicant: Telefonaktiebolaget LM Ericsson (publ), Stockholm (SE)

(72) Inventor: Rogier August Caspar Joseph Noldus, Goirle (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 188 days.

(21) Appl. No.: 15/100,729

(22) PCT Filed: Dec. 12, 2013

(86) PCT No.: PCT/EP2013/076462
§ 371 (c)(1),
(2) Date: Jun. 1, 2016

(87) PCT Pub. No.: WO2015/086086
PCT Pub. Date: Jun. 18, 2015

(65) Prior Publication Data
US 2016/0309360 A1 Oct. 20, 2016

(51) Int. Cl.
H04W 28/02 (2009.01)
H04W 36/00 (2009.01)
(Continued)

(52) U.S. Cl.
CPC ......... *H04W 28/0289* (2013.01); *H04L 43/16* (2013.01); *H04W 28/0226* (2013.01);
(Continued)

(58) Field of Classification Search
CPC ......... H04W 28/0289; H04W 36/0061; H04W 52/221; H04L 43/16
See application file for complete search history.

(56) References Cited

U.S. PATENT DOCUMENTS 6,141,565 A * 10/2000 Feuerstein ............ H04W 16/06
455/422.1

FOREIGN PATENT DOCUMENTS

EP 2635072 A1 9/2013
WO 2013156067 A1 10/2013

OTHER PUBLICATIONS

Lobinger, A. et al., "Coordinating Handover Parameter Optimization and Load Balancing in LTE Self-Optimizing Networks", 2011 IEEE 73rd Vehicular Technology Conference, May 15, 2011, pp. 1-5, IEEE.

* cited by examiner

Primary Examiner — Jamal Javaid
(74) Attorney, Agent, or Firm — Coats & Bennett, PLLC

(57) ABSTRACT

A method for controlling congestion in a cell of a mobile communications network, the mobile communications network comprising a plurality of cells for communicating with user devices, comprises the steps of analyzing over a period of time the load in a group of neighboring cells, the group of neighboring cells forming a subset of the plurality of cells. A movement path of a cluster of user devices is estimated based on the analysis of the load in the group of neighboring cells. The size of one or more cells along the estimated movement path is adapted to control congestion in one or more cells. The reducing or increasing a cell size may be performed artificially by adjusting a threshold value at which one or more user devices should initiate handover to a different cell.

12 Claims, 12 Drawing Sheets

(51) Int. Cl.
H04L 12/26 (2006.01)
H04W 52/22 (2009.01)
H04W 16/08 (2009.01)
H04W 36/32 (2009.01)

(52) U.S. Cl.
CPC ... H04W 28/0284 (2013.01); H04W 36/0061 (2013.01); H04W 36/0083 (2013.01); H04W 52/221 (2013.01); H04W 16/08 (2013.01); H04W 36/32 (2013.01)

APPARATUS AND METHOD FOR CONTROLLING CONGESTION IN A CELL OF A MOBILE COMMUNICATIONS NETWORK

TECHNICAL FIELD

The present invention relates to an apparatus and method for controlling congestion in a cell of a mobile communications network.

BACKGROUND

In a mobile communications network a geographical area is covered by a number of cells. For example, in a Long Term Evolution (LTE) network a number of evolved UMTS terrestrial radio access network (eUTRAN) cell sites cover a geographic area. The eUTRAN cell sites are positioned such that continuous LTE coverage is achieved in said geographic area.

FIG. 1 shows an example of eUTRAN cell sites, showing a group of neighboring cells $10_1$ to $10_7$, with one of the cells $10_1$ showing a division of the cell into 120-degree sectors. FIG. 1 is conceptual, and in reality the radio coverage does not form true hexagonal coverage areas. Cell sizes differ per area (for example in urban areas compared to rural areas), and cells will partially overlap to prevent white spots. In heterogeneous networks, micro cells are embedded within the coverage of macro cells. Frequency allocation to the respective sectors of the cells in a geographic area is arranged such that there is no or minimal interference by antennas using the same frequency. Further details about this type of communication will be familiar to a person skilled in the art, and defined by the third generation partnership project (3GPP) technical specifications relating to the 36.xxx series, which provide further information about eUTRAN radio transmission specifications.

Terminals in use by subscribers residing in one particular cell, and having established a functional radio connection with the appropriate sector of the eNodeB of that cell, continuously measure the signal strength of said appropriate sector of their current cell, as well as the signal strength of sectors of adjacent cell(s). When a subscriber is moving then, at some moment in time, handover (when engaged in a communication session) or location update (when not engaged in a communication session) will take place from the current cell to an adjacent cell.

Referring to FIG. 2, when a user equipment device is moving from cell $10_1$ towards cell $10_3$, the signal strength of cell $10_1$, as detected by the user equipment device of the subscriber, decreases, whilst the signal strength of cell $10_3$, as detected by that same user equipment device of the subscriber, increases. When the signal strengths are equal, a handover or location update is initiated for this user equipment device, to hand the user equipment device over from cell $10_1$ to cell $10_3$.

The "size of a cell" is determined by, among others, the transmission power as provided by the transceiver to the sector antenna and the signal amplification by the sector antenna. A cell will thus have a maximum radius (or "distance" in the case of non-spherical cell size) within which it can serve user equipment devices. The size of a cell is implicitly also determined by the signal from neighboring cells. When considering two adjacent cells, as depicted in FIG. 2, the boundary of the respective cells is formed by their intersection (whereby it shall be understood that the adjacent cells will partially overlap; their "intersection" will hence be formed by an area rather than by a line). A user equipment device residing within the coverage of cell $10_3$ could be served by cell $10_1$. However, since the user equipment device detects a stronger signal from cell $10_3$ than from cell $10_1$, it will camp on cell $10_3$.

Frequency planning and transmission power level planning are typically static. They are determined based on the geographical characteristics of the area, expected cell use, including the number of simultaneous calls, data traffic etc., per cell or per sector. Frequency planning is also a carefully executed activity.

Static planning of frequency allocation and transmission power cannot take ad hoc usage patterns into account. For example, when the number of subscribers residing in a cell (and being engaged in communication activity) reaches a particular threshold, there will be congestion in that cell (or the chance of congestion in that cell). As a consequence the cell will not be able to continue serving all subscribers residing in the cell for voice/video calls or for data services.

Techniques exist whereby neighboring cells can take over the service of a particular cell. Consider, for example, neighboring cells $10_1$ and $10_3$ of FIG. 2. When the base transceiver station in cell $10_1$ is (temporarily) non-operational, neighboring cell $10_3$ can increase its transmission power. The increase of transmission power by cell $10_3$ would in such case only be applied for the sector facing cell $10_1$. Subscribers residing in the coverage area of cell $10_1$ can then automatically start camping on cell $10_1$ and $10_3$. When cell $10_1$ has become operational again, cell $10_3$ can revert to its original transmission power level. Other neighboring cells for cell $10_1$ would behave in similar fashion as cell $10_3$, namely temporarily increasing their transmission power for the sector facing cell $10_1$.

While the above-described method is devised for the case that cell $10_1$ has become non-operational, it involves changes in transmission power level. This may have a far-reaching impact on cell planning as a whole. The adjustment of a transmission power level for one or more eNode-Bs may, in addition, affect Automatic Neighbor Relation (ANR) tables in the involved eNode-Bs. Hence, it is generally not desirable to adapt the transmission power level or frequency allocation for short-term, usage-driven adaptation to the network.

Another method of mitigating the problematic effects of high traffic in a particular cell is to revert to a lower quality voice codec or video codec, as appropriate. Adapting the codec will, however, be a complex process, as the subscribers in this particular cell who are engaged in a voice/video call, have negotiated a voice codec with a remote party. Voice codec is not under control of the eNode-B, but is instead controlled by the application, such as voice over LTE (VoLTE). Likewise, reducing data bearer throughput, for data sessions other than voice/video calls, cannot be undertaken autonomously by the eNode-B. Besides that, reverting to a lower quality codec or reducing data bearer throughput has a direct impact on end-user service level.

From the above it can be seen that existing techniques for dealing with congestion in a cell of a mobile communications network can lead to other problems, such as adversely affecting frequency re-use techniques in situations where power levels are changed, or service level quality in situations where codec quality is changed.

SUMMARY

It is an object of the present invention to provide a method and apparatus which obviate or reduce at least one or more of the disadvantages mentioned above.

According to a first aspect of the present invention there is provided a method for controlling congestion in a cell of a mobile communications network, the mobile communications network comprising a plurality of cells for communicating with user devices. The method comprises the steps of analysing over a period of time the load in a group of neighboring cells, the group of neighboring cells forming a subset of the plurality of cells. A movement path of a cluster of user devices is estimated based on the analysis of the load in the group of neighboring cells. The size of one or more cells along the estimated movement path is adapted to control congestion in one or more cells.

According to another aspect of the present invention there is provided a system for controlling congestion in a cell of a mobile communications network, the mobile communications network comprising a plurality of cells for communicating with user devices. The system comprises: an analysing unit adapted to analyse, over a period of time, the load in a group of neighboring cells forming a subset of the plurality of cells; an estimating unit adapted to estimate a movement path of a cluster of user devices based on the analysis of the load in the group of neighboring cells; and an adapting unit for adapting the size of one or more cells along the estimated movement path.

According to another aspect of the present invention, there is provided a computer program product for running on a processor of a control node for controlling congestion in a cell of a mobile communications network, the mobile communications network comprising a plurality of cells for communicating with user devices. The computer program product is configured to perform the steps of: analysing over a period of time the load in a group of neighboring cells, the group of neighboring cells forming a subset of the plurality of cells; estimating a movement path of a cluster of user devices based on the analysis of the load in the group of neighboring cells; and adapting the size of one or more cells along the estimated movement path to control congestion in one or more cells.

According to another aspect of the present invention, there is provided a computer program product for running on a processor of a base station node for controlling congestion in a cell of a mobile communications network, wherein the communications network comprises a plurality of cells, and wherein the communications network comprises a threshold value relating to a signal power level at which a user device should initiate handover to an adjacent cell from a current cell. The computer program product is configured to perform the steps of: receiving an offset value from a control node, the offset value comprising an adjustment parameter for adjusting a threshold value at which a user device should initiate handover to a neighboring cell; adjusting a currently configured threshold value using the offset value to generate anew threshold value; and transmitting the new threshold value to one or more user devices associated with the base station node.

According to another aspect of the present invention, there is provided a terminal for controlling congestion in a cell of a mobile communications network, the mobile communications network comprising a plurality of cells for communicating with user devices. The terminal comprises: an analysing module for analysing over a period of time the load in a group of neighboring cells, the group of neighboring cells forming a subset of the plurality of cells; an estimating module for estimating a movement path of a cluster of user devices based on the analysis of the load in the group of neighboring cells; and an adapting module for adapting the size of one or more cells along the estimated movement path to control congestion in one or more cells.

According to another aspect of the present invention, there is provided a terminal for controlling congestion in a cell of a mobile communications network, wherein the communications network comprises a plurality of cells, and wherein the communications network comprises a threshold value relating to a signal power level at which a user device should initiate handover to an adjacent cell from a current cell. The terminal comprises: a receiving module for receiving an offset value from a control node, the offset value comprising an adjustment parameter for adjusting a threshold value at which a user device should initiate handover to a neighboring cell; an adjusting module for adjusting a currently configured threshold value using the offset value to generate anew threshold value; and a transmitting module for transmitting the new threshold value to one or more user devices associated with the base station node.

BRIEF DESCRIPTION OF THE DRAWINGS

For a better understanding of the examples of the present invention, and to show more clearly how the examples may be carried into effect, reference will now be made, by way of example only, to the following drawings in which.

DETAILED DESCRIPTION

Figure 1:
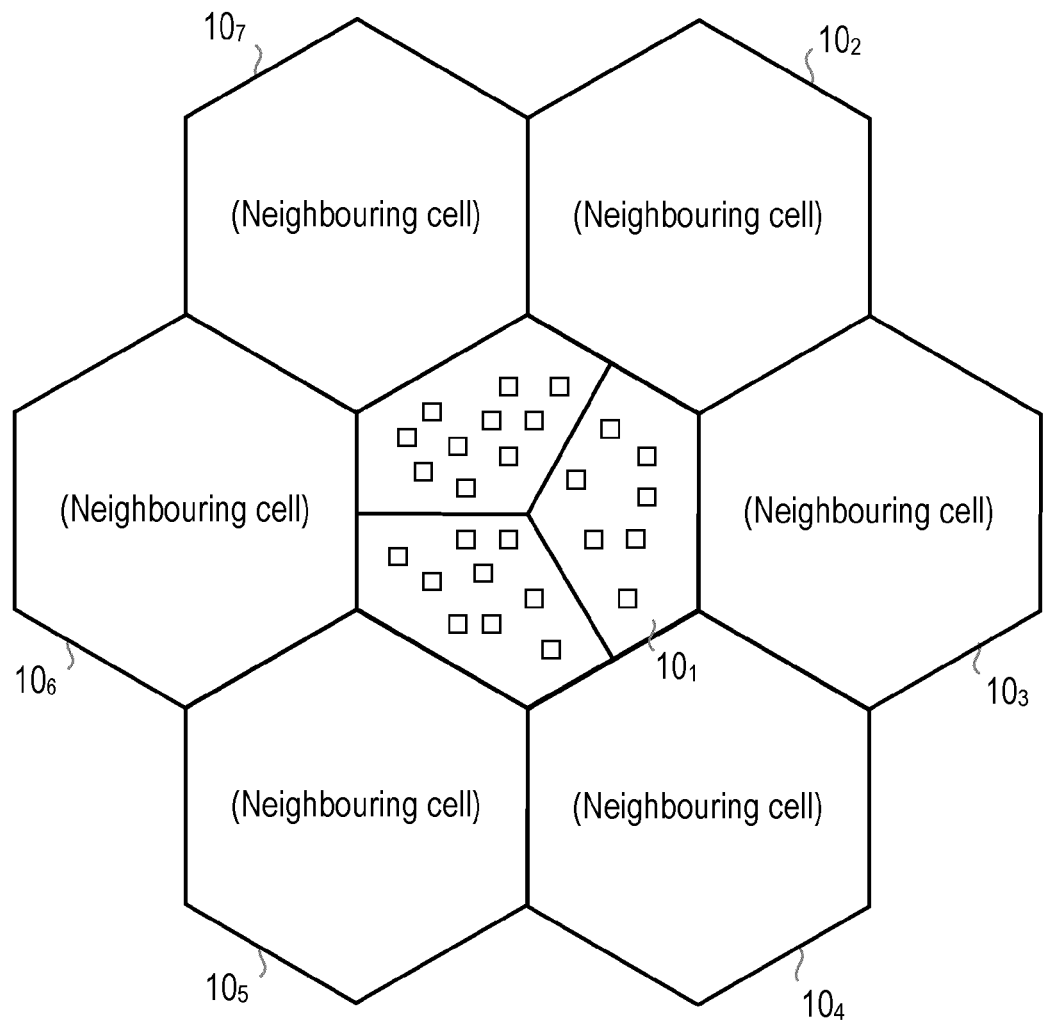
FIG. 1 is a block diagram illustrating an example of cell sites in a mobile communications network.
Figure 2:
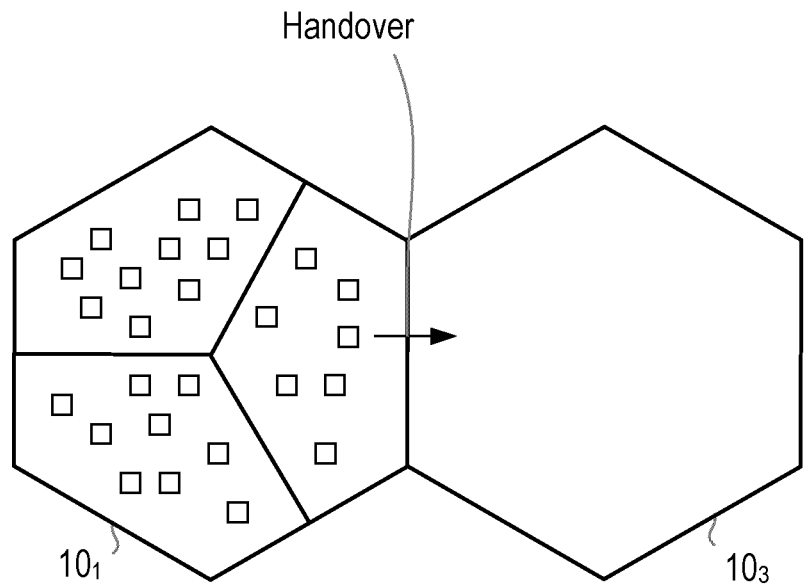
FIG. 2 is a block diagram illustrating a handover between cell sites.
Figure 3:
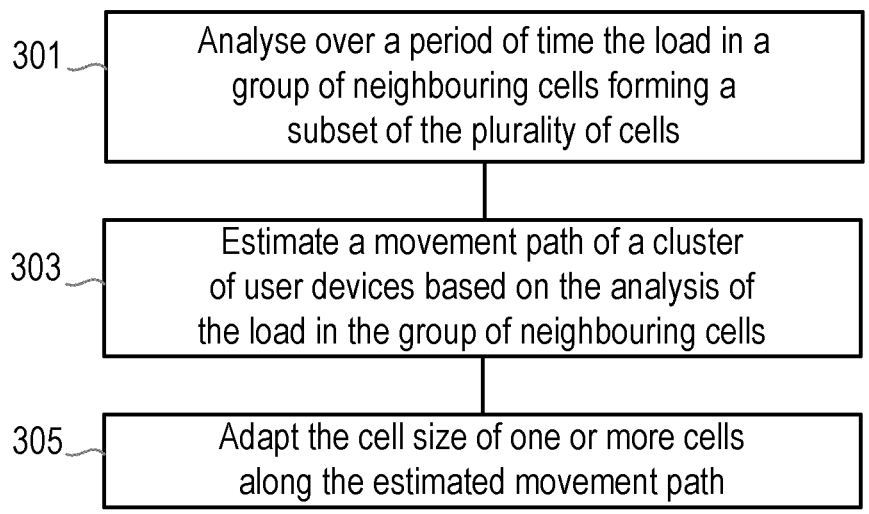
FIG. 3 is a flow chart illustrating a schematic embodiment of method steps.

FIG. 3 shows a method according to an embodiment of the present invention, for controlling congestion in a cell of a mobile communications network, the mobile communications network comprising a plurality of cells for communicating with user devices. The method comprises the steps of analysing over a period of time the load in a group of neighboring cells, step 301, the group of neighboring cells forming a subset of the plurality of cells. In step 303 a movement path of a cluster of user devices is estimated based on the analysis of the load in the group of neighboring cells. In step 305 the size of one or more cells along the estimated movement path is adapted to control congestion in one or more cells.

Figure 4:
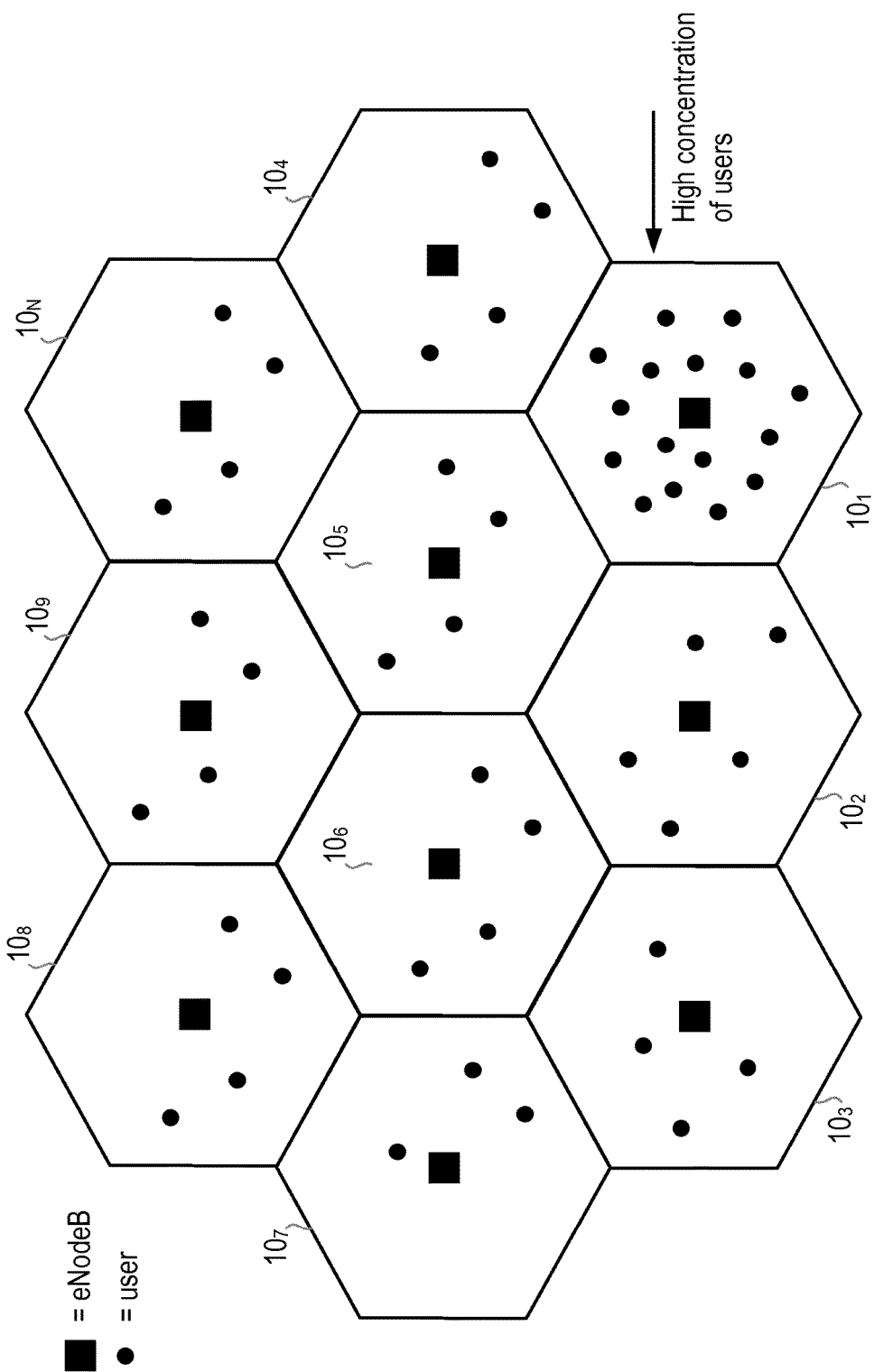
FIG. 4 is a block diagram illustrating a schematic diagram of a mobile network.

FIG. 4 shows an example of a group of neighboring cells $10_1$ to $10_N$. The group of neighboring cells $10_1$ to $10_N$ form a subset of a plurality of cells $10_1$ to $10_M$ that form the mobile communications network (wherein M≥N). From FIG. 4 it can be seen that the load in one particular cell, cell $10_1$, is higher than the load in the other cells in the group of neighboring cells. In this example cell $10_1$ comprises a higher concentration of user devices. It is noted, however, that a high load could also result from fewer user devices, these fewer user devices having high-bandwidth applications.

By analyzing the load in the group of neighboring cells over a period of time, for example monitoring the load in a group of cells $10_1$ to $10_N$, a movement path of a cluster of user devices can be estimated. For example, the high concentration of user devices in cell $10_1$ and/or a concentration of high-bandwidth user device can be analyzed to determine whether a cluster of user devices has a particular movement pattern, thus enabling a movement path to be estimated for a cluster of user devices that are likely to cause congestion problems along the estimated movement path. An advantage of estimating a movement path is that pre-emptive cell size adaptation, for example an "artificial" cell size adaption (as will be described further below) can be performed.

A cell that is currently experiencing high load, and/or that is predicted to experience a high load, may adapt (or may be instructed to adapt) its cell size. A cell may reduce or increase its cell size because it cannot cope with the number of subscribers, and therefore takes action to cause some of the subscribers to move to a neighboring cell or cells. One or more neighboring cells will take over a portion of the subscribers in the high-load cell, in accordance with the methods described herein.

As will be described later in the application, a network entity such as a control node (for example an operations support system-business support system (OSS-BSS) entity) controlling this group of neighboring cells may keep an overview of the load in the respective cells over a period of time. By doing so, the OSS-BSS entity may instruct the respective cells to reduce or increase their cell size. According to embodiments of the invention, the reducing or increasing of a cell size may be achieved using an "artificial" cell size reducing/increasing technique, by changing the threshold value at which one or more user devices should initiate a handover from one cell to another (further details of which will be described later in the application). At a subsequent moment in time, the load in the concerned cell may have decreased and the load in one of the neighboring cells may have increased. This may be caused by a large number of users, a cluster of user devices, moving in a particular direction, i.e. a cluster or predetermined number of user devices on average moving from the coverage area of one cell towards the coverage are of one of the neighboring cells. The "new cell" where this cluster of user devices, on average, now resides may artificially decrease its cell size and the "old cell" from where this group of users, on average, moved from, may artificially increase its cell size.

It is noted that the "old cell" may, in this scenario, for a certain duration, first increase its cell size towards, for example, 110% of normal size, and then revert back to 100% of normal size. This temporary increase to 110% is to alleviate the load in the neighbouring cell, into which this cluster of user devices has moved into.

Figure 5A:
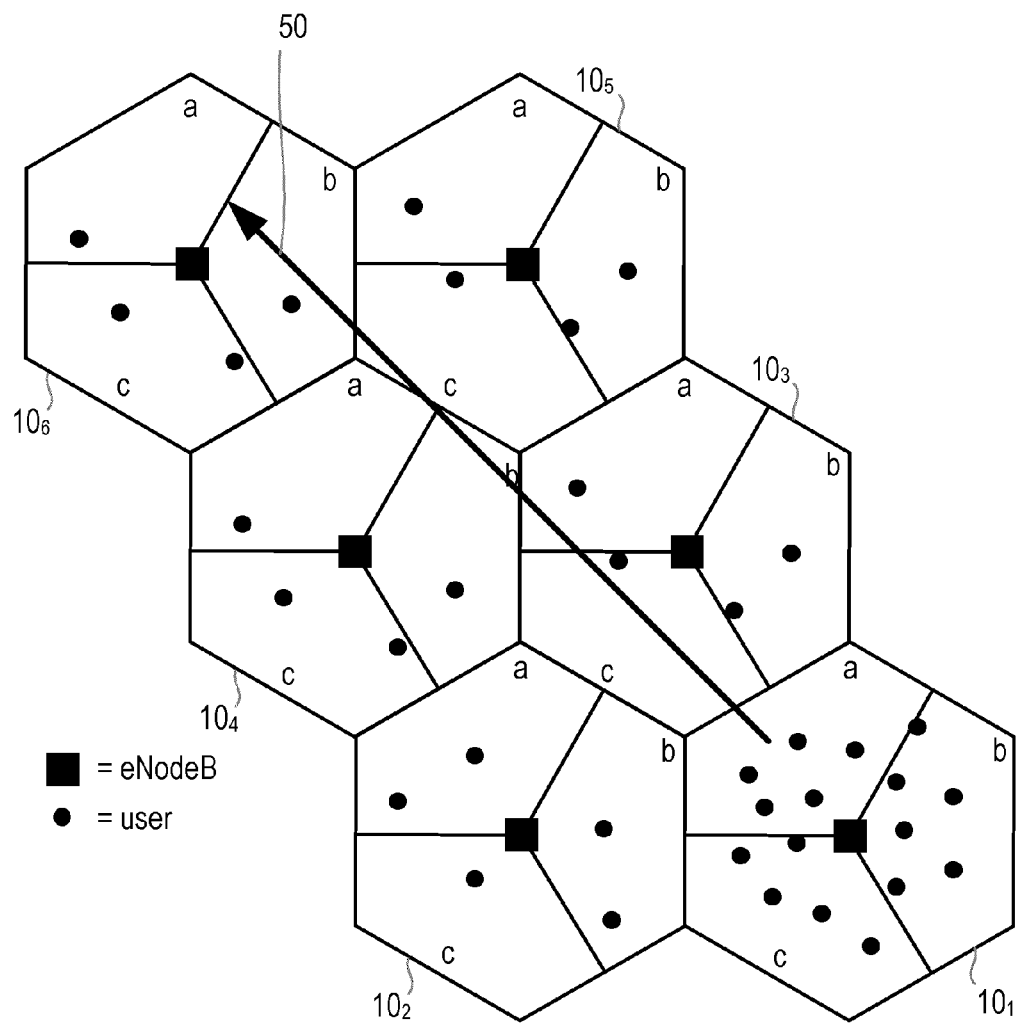
FIG. 5a is a block diagram illustrating a schematic embodiment of a mobile network.

This is schematically depicted in FIG. 5a, which shows another example of a group of neighboring cells $10_1$ to $10_6$. From FIG. 5a it can be seen that the load in one particular cell, cell $10_1$, is higher than the load in the other cells in the group of neighboring cells, for example because cell $10_1$ comprises a higher concentration of user devices. As mentioned previously, a high load can also result from a concentration of high-bandwidth user devices, or a combination of both. By analyzing the load in the group of neighboring cells $10_1$ to $10_6$ over a period of time, an estimated movement path of a cluster of user devices can be determined. For example, the high concentration of user devices in cell $10_1$ can be analyzed to determine whether a cluster of user devices has a particular movement pattern, thus enabling a movement path 50 to be estimated.

The size of one or more cells along the estimated movement path can then be adapted, as a cluster of user devices moves along the estimated movement path 50.

According to one embodiment, the step of adapting the size of a cell comprises the step of decreasing the size of a cell in response to a predetermined portion of a cluster of user devices moving into that cell, and the step of increasing the size of a cell in response to a predetermined portion of a cluster of user devices moving out of that cell. Such an embodiment relates to the cell sizes being adjusted reactively, as a cluster of user devices (for example a predetermined portion of user devices, which is high enough to indicate a high load, or likely to cause congestion) moves from one cell to another. It is noted that the size of a cluster required to trigger this type of cell size adaptation will depend on a particular application, and can vary from one application to another. It is also noted that as a particular cell is reduced in size, one or more adjacent cells will have their size increased, thus assisting with the congestion in the cell having its size reduced.

According to an alternative embodiment, the step of adapting a cell size comprises the step of reducing the size of a cell prior to a cluster of user devices moving into that cell, based on the estimated movement path, and the step of increasing the size of a cell in response to a cluster of user devices moving out of a cell. As above, it is noted that as a particular cell is reduced in size, one or more adjacent cells will have their size increased, thus assisting with the congestion in the cell having its size reduced.

In one embodiment, the adapting of the size of one or more cells along the estimated movement path involves a control node (not shown) of the mobile communications network performing the steps of reducing the size of at least one cell along the estimated movement path by adjusting a threshold level relating to a signal power level at which one or more user devices of a particular cell should initiate handover to a neighboring cell, and increasing the size of one or more neighboring cells. For example, the size of the cell $10_1$ itself may be reduced by adjusting a threshold level relating to a signal power level at which one or more user devices within cell $10_1$ should initiate handover to a neighboring cell. The size of the neighboring cell $10_3$ will be increased by the control node.

The technique of adjusting the threshold level at which a user device should initiate a handover can be considered as a form of "artificial" cell size reducing/increasing technique as mentioned above, and as described in greater detail later in the application.

In addition to reducing the size of cell $10_1$, the estimated movement path can be used to reduce the size of one or more other cells along the estimated movement path. For example, according to one example the size of the cells are pre-emptively reduced prior to a cluster of user devices moving into that cell. For example, this may involve cell $10_3$ being reduced initially, followed by cells $10_4$, $10_5$ and $10_6$. Alternatively, the size of a cell may be reduced in reaction to a cluster of user devices moving into a cell, i.e. as compared to pre-emptively.

According to one embodiment, the method may comprise the steps of controlling the size of a cell which is currently closer to the cluster of user devices to be smaller than the size of a cell which is currently further away from the cluster of user devices along the estimated movement path 50. For example, cell $10_3$, which is currently closer to the cluster of user devices in cell $10_1$, may be pre-emptively reduced in size to a greater extent than another cell, such as cells $10_4$ or $10_5$, which are currently further away from the cluster of user devices. This has the advantage of allowing cell sizes to be artificially reduced in size in a gradual manner along the estimated movement path, thereby providing a smooth flow for the cluster of user devices.

According to one embodiment, the step of adapting the size of one or more cells along the estimated movement path 50 further comprises the step of increasing the size of one or more cells adjacent to a cell that is being reduced in size along the estimated movement path, and/or increasing the size of one or more cells in the wake of an observed movement path of the cluster of user devices, wherein the size of a cell is increased by adjusting a threshold level relating to a signal power level at which one or more user devices of a particular cell should initiate handover to a neighboring cell.

Increasing the size of cells in the wake of the observed movement path allows cell sizes to be returned to "normal" when a cluster of user devices has moved on from one cell to another.

According to an embodiment of the present invention, the adjustment of a cell size may be performed or effected in an artificial sense, by adjusting the threshold level at which one or more user devices within a cell should initiate handover to another cell. As such, a particular cell that is experiencing a high-load condition, or that is (expectedly) about to experience a high-load condition (for example as determined by the estimated movement path), may instruct one or more devices residing in its coverage area to initiate a handover to a neighboring cell at an earlier stage.

This has an advantage in that the adjacent cells do not have to adjust their transmission power, nor the transmission power of the high-load cell itself. Instead, even with the existing power level, user devices (e.g. mobile phones) will at an earlier stage reach the threshold for initiating a handover to an adjacent cell. The effective result is that neighboring cell(s) will take over part of the load of the cell that is currently experiencing high load.

From the description of FIG. 5a above it can be seen that, through the monitoring of the cell load, for example using an OSS-BSS entity, it can be predicted where the cell load will move to. Short-term analysis of the cell load, over the group of cells, may result in detection of a pattern of users moving in a certain direction. This is depicted by the arrow 50 in FIG. 5a corresponding to an estimated movement path. The OSS-BSS entity can now pre-emptively create a form of coverage path for these subscribers, i.e. a cluster of user devices. In one embodiment the eNodeB sectors (e.g. 120° sectors) on the path will pre-emptively reduce their cell size, so as to be able to cope with the expected influx of users. The sectors on the path, closest to the current hot spot (current concentration of users along the path) can apply a larger cell size decrease factor than sectors on the path that are further away from the current hot spot.

Figure 5B:
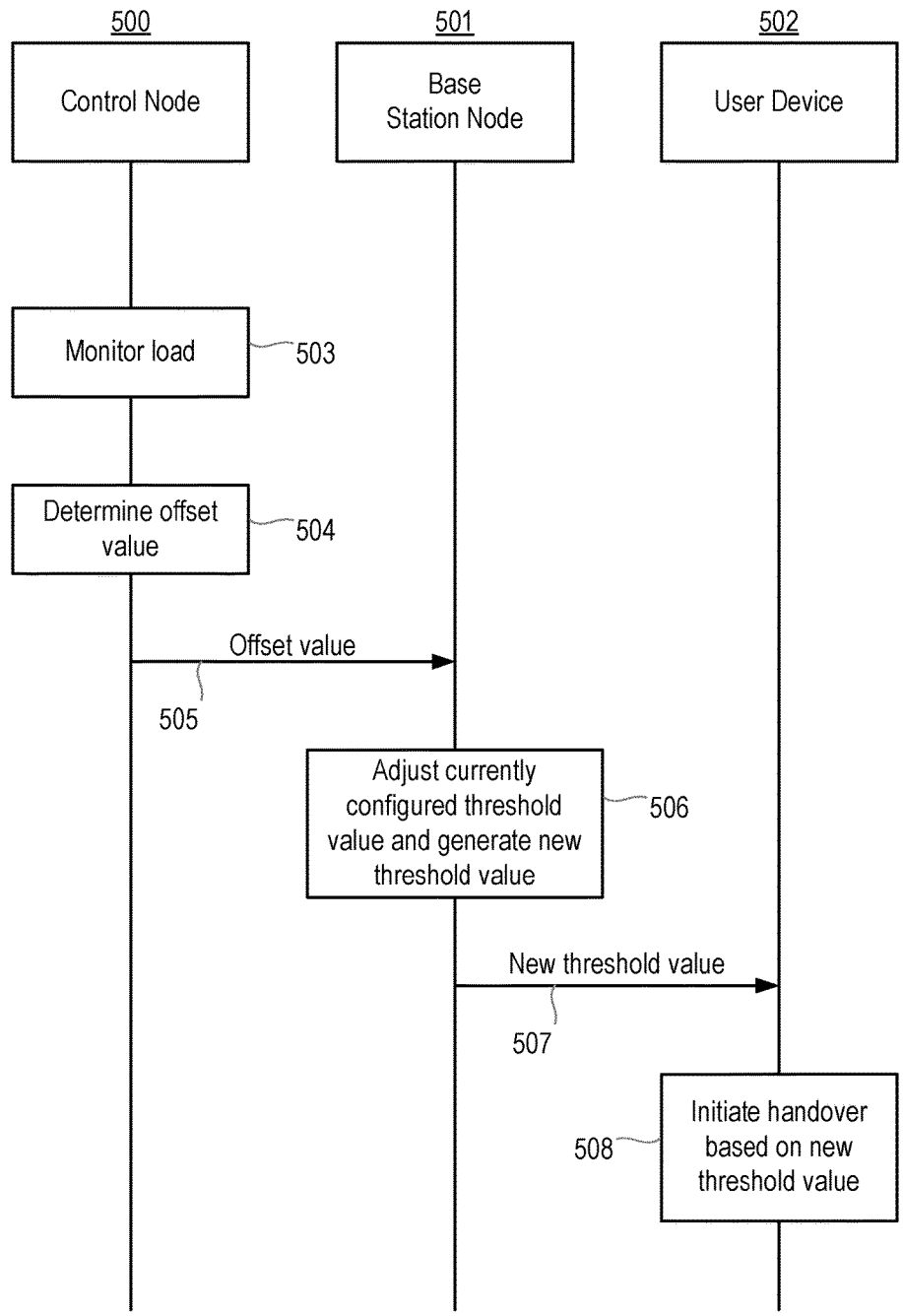
FIG. 5b is a block diagram illustrating a schematic embodiment of a mobile network.

FIG. 5b shows how various nodes in a mobile communication network may communicate according to an embodiment of the present invention. The mobile communication system is shown as comprising a control node 500 (for example an MME or an OSS-BSS entity), a base station node 501 (for example an eNodeB) and a user device 502 (for example any form of user equipment or user device). It is noted that the network can have any number of control nodes 500, base station nodes 501 or user devices 502.

The control node 500 is adapted to monitor the load in cells of a mobile communication network, step 503, for example as described above. The control node determines in step 504 an offset value to be used in adjusting a threshold value at which a user device should initiate a handover to a neighboring cell. The control node 500 communicates this offset value 505 to a base station 501, that is, a base station whose cell size is to be artificially reduced or increased. Although not shown, it will be appreciated that several base station nodes may receive this offset value 505 (with one or more base station nodes receiving an offset value to cause a reduction in cell size, and one or more receiving an offset value to cause an increase in cell size). The base station node uses the received offset value to adjust a currently configured threshold value, to generate a new threshold value which is to be used by user devices associated with the cell being controlled by the base station 501. The base station node 501 communicates, step 507, the new threshold value to one or more user device 502. A user device 502 then uses the new threshold value to initiate handover to another cell.

Further details will now be provided about the artificial cell size reduction.

Figure 6:
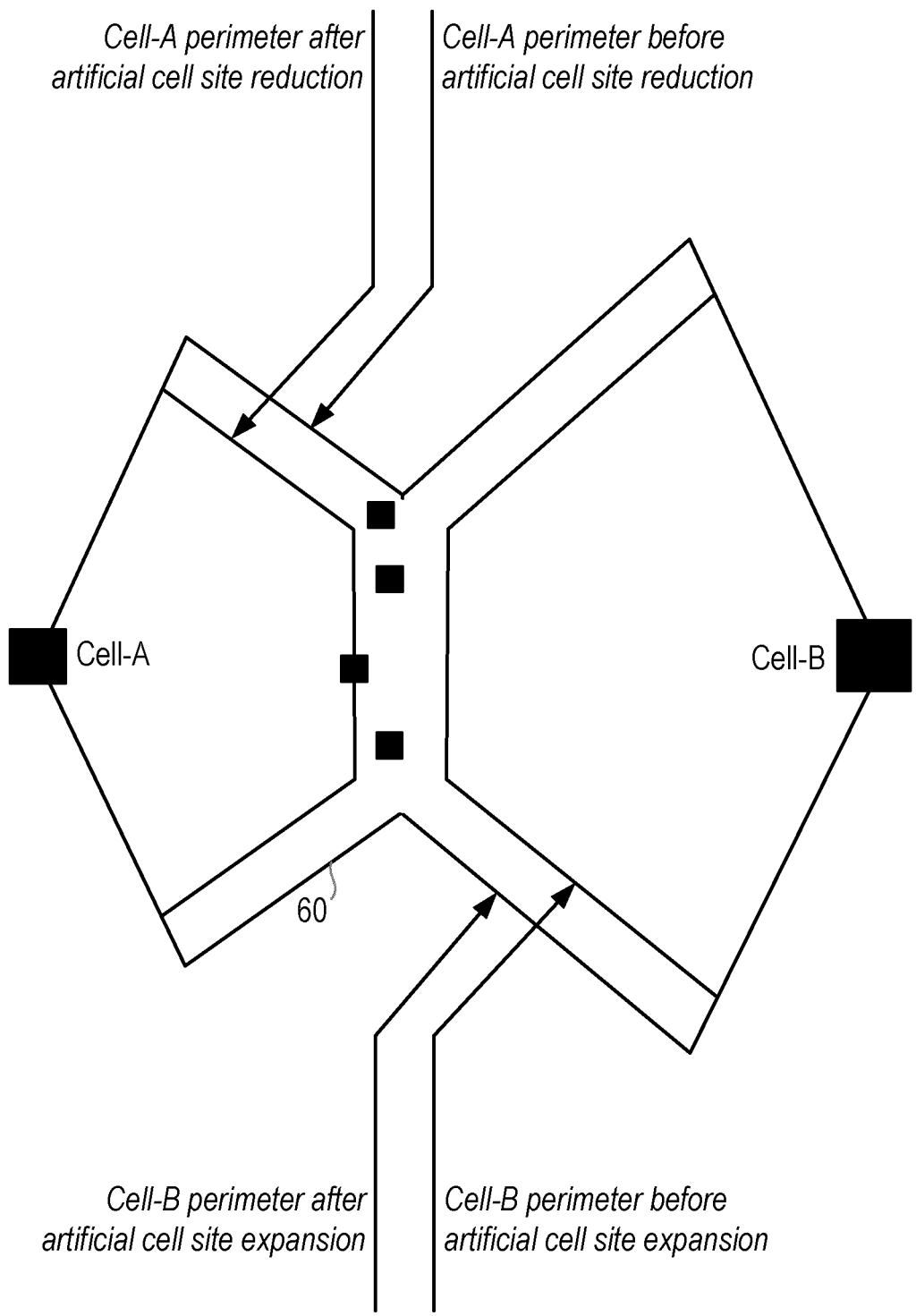
FIG. 6 is a block diagram illustrating a schematic embodiment of a mobile network.

Referring to FIG. 6, when congestion in Cell-A is detected (or predicted based on an estimated movement path), Cell-A can be configured to artificially reduce its cell size. The artificial cell size reduction involves adjusting the threshold level at which one or more user devices within Cell-A will initiate a handover procedure. At the same time, Cell-B artificially increases its cell size. The effect that is harvested is that user devices residing in an outer perimeter region 60 of Cell-A, and in particular residing in an outer perimeter region of Cell-A which is adjacent to Cell-B, will initiate a handover to Cell-B if such user devices have a lower threshold value for initiating handover (compared to the "normal" threshold value used by other user devices associated with Cell-A for initiating handover). As a result, these user devices or terminals enter the coverage area of Cell-B. More precisely, they enter the artificially expanded coverage area of Cell-B as a result of their threshold values being reduced. This will trigger such user devices to initiate a handover to Cell-B. Any user devices that reside within the reduced size of Cell-A remain on Cell-A; these user devices have not reached the threshold that leads to initiating handover to a neighboring cell.

The net result is that a portion of the terminals residing in Cell-A hand over to Cell-B. The load of Cell-A is hence partially distributed over Cell-A and Cell-B. It is noted that the artificial cell size increase can be applied within certain limits only. For example, if the size of Cell-B would be artificially increased too much, the signal strength detected by a user device in the outer perimeter region of the extended Cell-B would fall below the minimum level required for communication between the user device and the eNodeB of Cell-B.

It is noted that FIG. 6 is an abstract representation of adjacent cells. The reduction or increase of the cell size is not reflected in proportion. In addition, FIG. 6 reflects reducing/increasing cell size artificially for adjacent cells Cell-A and Cell-B. It is noted that Cell-A will be adjacent to other cells, in addition to Cell-B. As such, the concept of artificially reducing/increasing cell size can be applied for all adjacent cells.

Figure 7:
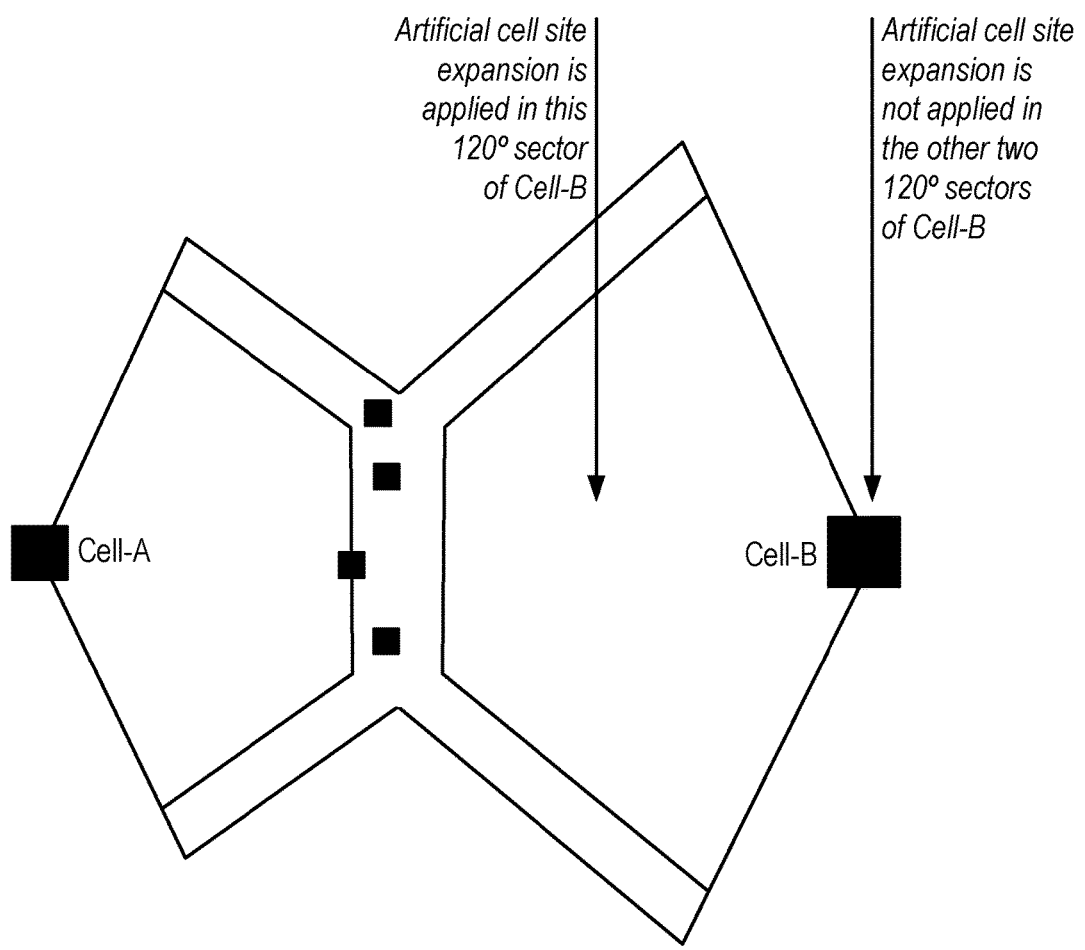
FIG. 7 is a block diagram illustrating a schematic embodiment of a mobile network.

Referring to FIG. 7, according to one embodiment the concept of artificial cell size reduction can be applied more specifically to the sectors of cells, and in particular to cell sectors of said adjacent cells. Thus, with reference back to FIG. 5a, an embodiment of the present invention may be adapted to reduce a cell size by reducing a sector of that particular cell, and increasing the cell size of an adjacent cell by increasing the adjacent sector in that cell. In such embodiments, one or more user devices within a respective sector can have an adjusted threshold level for initiating handover.

Thus, according to one embodiment, each cell comprises a plurality of sectors, and the method comprises the step of reducing a cell size by reducing the size of one or more sectors within the cell, and the step of increasing the size of one or more sectors of the respective one or more neighboring cells. For example, the step of increasing the size of a neighboring cell comprises the step of increasing a sector of a neighboring cell that interfaces with a sector of the cell being reduced.

As above, the concept of artificially reducing/increasing a cell size can be applied for all adjacent cells. This may be applied equally to adjacent cells (through each adjacent cell receiving the same threshold value) or differently to adjacent cells (for example, through different adjacent cells receiving different threshold values).

By only changing the sizes of individual sectors rather than cells as a whole, this may enable a more defined movement path to be followed.

Figure 8:
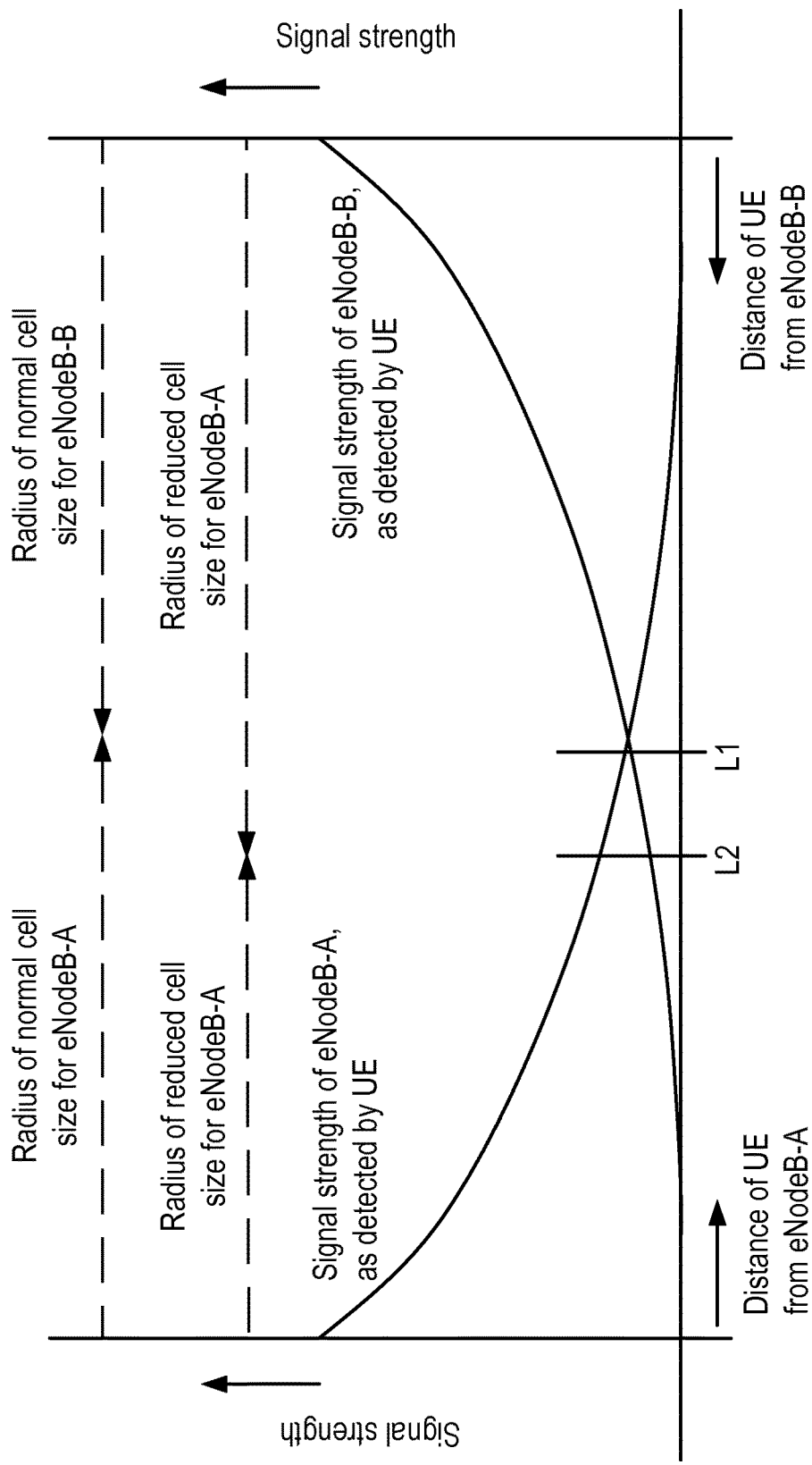
FIG. 8 is a graph, schematically illustrating signal strengths in an embodiment of a network.

FIG. 8 depicts, schematically, the signal strength detected by a user device. For the case that eNodeB-A and eNodeB-B have equal transmission power and environmental conditions are equal, eNodeB-A and eNodeB-B have (theoretically) equal cell radius. This is depicted by L1, with a handover being normally conducted about this point. Artificial cell size reduction of eNodeB-A combined with corresponding cell size increase of eNodeB-B, leads to a handover point at L2. FIG. 8 also depicts the decreased cell size for eNodeB-A and the increased cell size for eNodeB-B.

Figure 9:
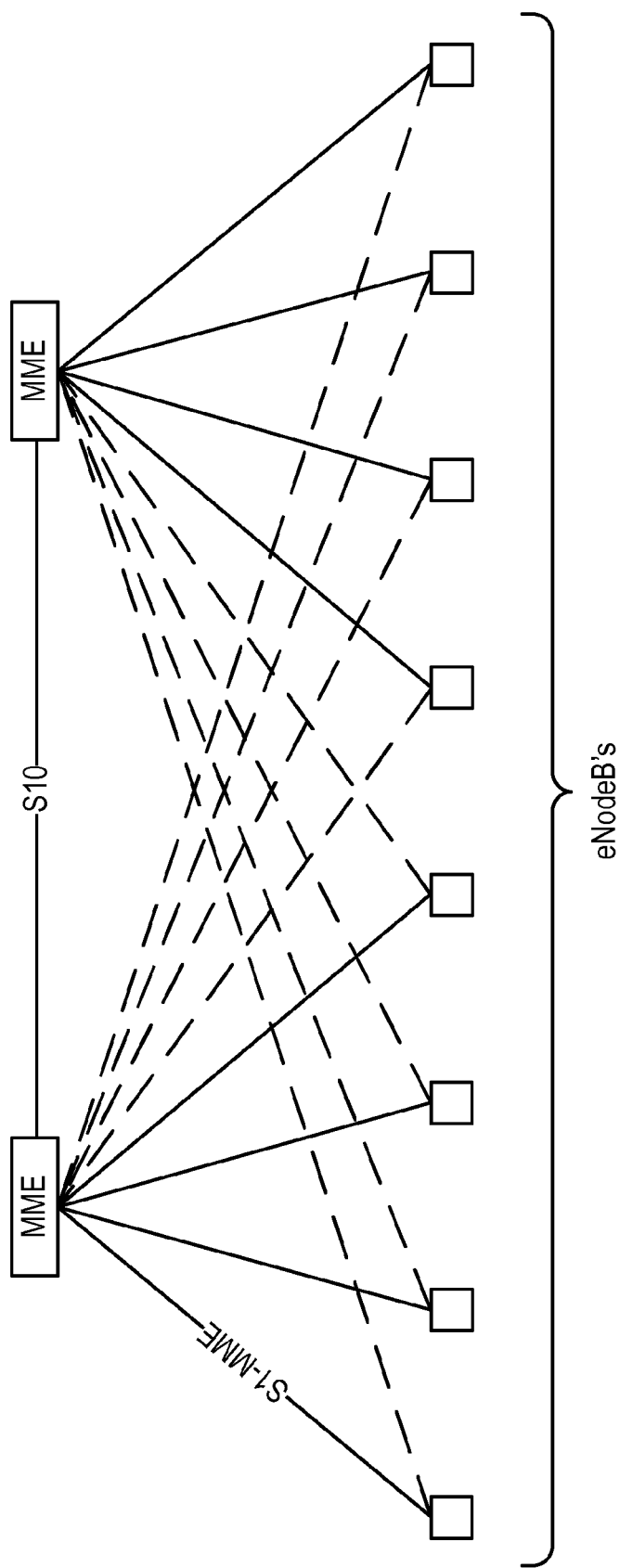
FIG. 9 is a block diagram illustrating a schematic embodiment of a mobile network.

Referring to FIG. 9, the artificial reduction and expansion of the respective adjacent cells, when deemed necessary, is coordinated between the involved cells, for example using a control node or entity. For an LTE network, for example, the eNodeB's are controlled by a mobility management entity (MME). The eNodeB's report on a regular basis their load status, in terms of traffic transmission capacity usage and number of served subscribers, to the MME. The MME can in this manner determine that one particular eNodeB is reaching a particular usage threshold and can then instruct that particular eNodeB to artificially reduce its cell size and instruct one or more neighboring cells to artificially increase their cell size, for example in relation to the sectors facing that particular (high usage) cell. In this manner, the MME can continuously monitor the load on the eNodeB's that are connected to this MME and can apply artificial cell size reduction or increase, as appropriate, to offload some cells of a part of their subscribers. It is noted that one eNodeB may control a single cell or a group of cells. The load monitoring and the artificial cell size adaptation pertain to a particular cell. Signaling related to said monitoring and signaling related to said adaptation runs via the eNodeB that is in control of the respective cell.

According to one embodiment, the step of adjusting the threshold level (i.e. the signal reception level at which a user device initiates a handover operation) comprises the step of communicating to a user device that an adjusted signal power level should be used as the signal power level at which handover to a neighboring cell should be initiated.

This step of adjusting a threshold level may further comprise the step of transmitting an offset value to a base station, e.g. an eNodeB, associated with a cell whose size is to be reduced or increased, such that the base station can communicate an adjusted threshold value to one or more user devices within that cell.

According to one embodiment, the artificial reduction and expansion of a cell size is accomplished using a System Information Block (SIB) message. SIB messages are specified in 3GPP TS 36.211 and in 3GPP TS 36.213. In LTE, an eNodeB uses SIB messages, among others, for instructing terminals (user devices or user equipment) in its coverage area, about the signal power level at which handover to an adjacent cell should be initiated.

More specifically an eNodeB can use a SIB message to inform one or more user devices under its coverage to increase the signal power level, related to the cell the device currently resides in, at which handover to an adjacent cell should be initiated. This has the effect that user devices near the edge of this cell (or sector) will at an earlier stage initiate handover to an adjacent cell.

In addition, an eNodeB can use a SIB message to inform one or more user devices under its coverage to decrease the signal power level, related to the cell the device currently resides in, at which handover to an adjacent cell should be initiated. This has the effect that user devices near the edge of this cell (or sector) will at a later stage initiate handover to an adjacent cell.

FIG. 9 depicts the coordination of the artificial cell size by a control node, for example an MME in a LTE network. The reference point between an eNodeB and an MME is known as S1-MME (as described in 3GPP TS 36.413). The MME maintains a table with geographical location of each eNodeB. When one particular eNodeB reports a high load condition, which corresponds to a cluster of user devices, the MME can determine, based on said table, which neighboring cells(s) could take over part of the served subscribers of said particular eNodeB, by artificially increasing the cell size of the adjacent cells, as described herein. When coordination is required regarding artificial cell size reduction and increase for adjacent cells controlled by different MME's, then the respective MME's can be configured to synchronize their information regarding the load of the eNodeB's and the currently applicable artificial cell size. Functional connection (reference point) between MME's is referred to as S10, and is specified in 3GPP TS 29.274.

In practice, subscribers may be dynamically allocated to an MME. Hence, each eNodeB has a functional connection to a plurality of MME's, as illustrated in FIG. 9. Although an eNodeB can have a functional connection to a plurality of MME's, the management of a particular eNodeB typically resides with a specific MME.

In an embodiment such as that shown in FIG. 9, the method of communicating threshold information to a base station may involve communicating via another node of the communications system. This may include a situation in which different MMEs cover different cells, whereby one MME will coordinate with another MME.

High load in one particular eNodeB may manifest itself as a node-internal load, but also through overload on the reference point between the eNodeB and the packet data gateway (PDN-Gw), known as the S1-U reference point (as described in 3GPP TS 29.281). By shifting a portion of these user devices to an adjacent cell, i.e. an adjacent eNodeB, the load on the S1-U reference point between the particular (overloaded) eNodeB and the PDN-Gw may be reduced; the load will be partially shifted to another S1-U reference point instance (namely between the new eNodeB, to which the subscriber has handed over, and the PDGw).

Figure 10:
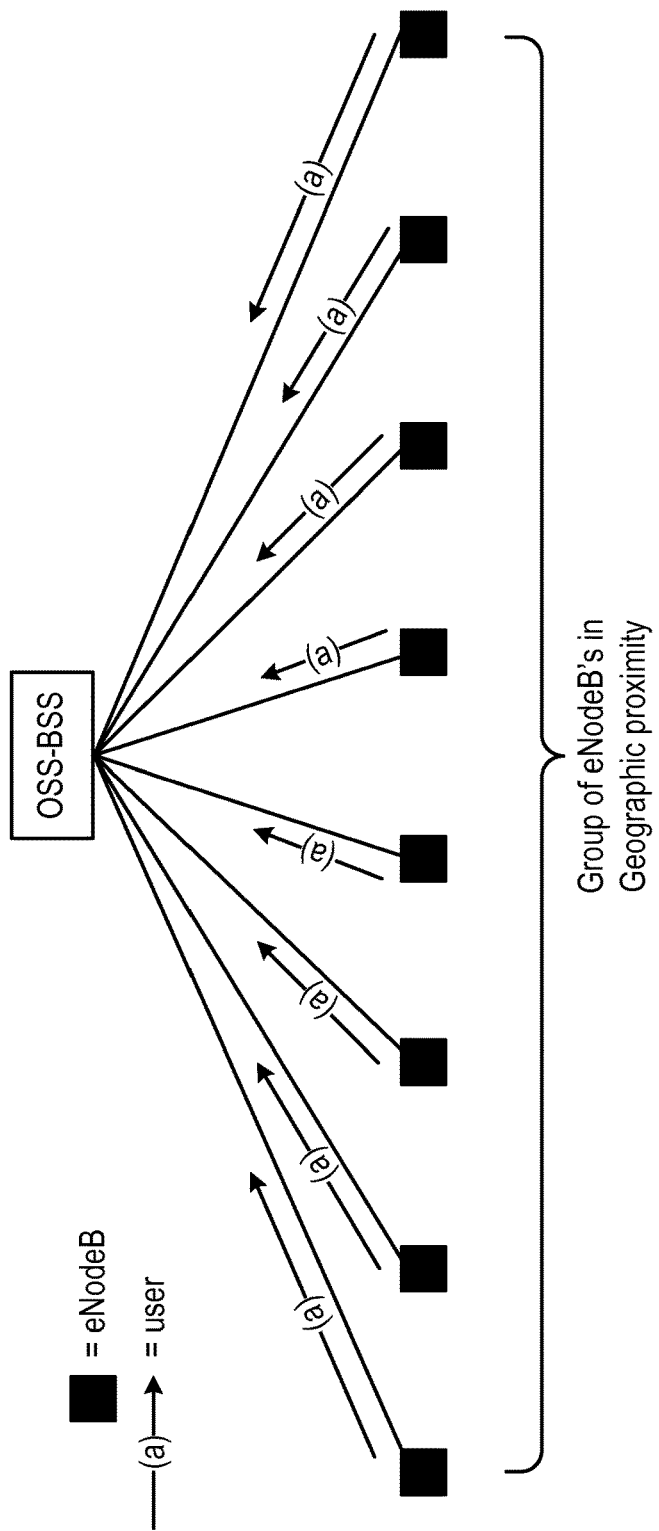
FIG. 10 is a block diagram illustrating a schematic embodiment of a mobile network.

FIG. 10 shows a mobile communication network according to another embodiment of the present invention, and gives a graphical representation of interworking between a group of base stations, such as eNodeBs, and a control node, such as an OSS-BSS, for the purpose of pre-emptively adjusting the cell size. Specifically, FIG. 10 depicts the collection, by OSS-BSS, of load status information from a group of neighboring eNodeB's in geographic proximity.

Further details will now be provided in relation to how the threshold value used to initiate handover to a different cell is communicated to one or more user devices. According to one embodiment, an offset for the threshold level of the radio signal at which handover should be initiated, is broadcast by an eNodeB using a signal parameter known as SystemInformationBlockType1. Table 1 shows an example of an abstract syntax notation one (ASN.1) protocol specification (as described in 3GPP TS 36.331).

As stated earlier, a limit may be imposed on the amount by which the size of a cell can be artificially increased in size. Imposing such a limit has the advantage of not increasing the cell size too much. Otherwise, if the size of a cell was artificially increased too much, the signal strength detected by a user device in the outer perimeter region of that extended cell would fall below the minimum level required for communication between the user device and the eNodeB of that cell. Therefore, when using the SystemInformationBlockType1 radio signal, the eNodeB can be configured to ensure that the q-RxLevMinOffset value is within suitable limits.

Using an offset value, rather than an absolute q-RxLevMinOffset value, in the transfer of the threshold value information from a control node toan eNodeB, can have advantages in embodiments of the invention.

According to one embodiment an offset value, being a parameter sent form a control node to an eNodeB, comprises a positive or negative integer value (+/− offset value) to be added to or subtracted from, respectively, a currently configured threshold value (for example, the currently configured threshold value of an eNodeB, for example the parameter q-RxLevMinOffset) to generate an adjusted threshold value.

Alternatively, an offset value comprises a resize factor (>1 or <1) to be multiplied with a currently configured threshold value (for example the currently configured threshold value being the parameter q-RxLevMinOffset) to generate an adjusted threshold value.

TABLE 1

```
SystemInformationBlockType1 ::=   SEQUENCE {
    cellAccessRelatedInfo             SEQUENCE {
        plmn-IdentityList                 PLMN-IdentityList,
        trackingAreaCode                  TrackingAreaCode,
        cellIdentity                      CellIdentity,
        cellBarred                        ENUMERATED {barred, notBarred},
        intraFreqReselection              ENUMERATED {allowed, notAllowed},
        csg-Indication                    BOOLEAN,
        csg-Identity                      CSG-Identity       OPTIONAL -- Need OR
    },
    cellSelectionInfo                 SEQUENCE {
        q-RxLevMin                        Q-RxLevMin,
        q-RxLevMinOffset                  INTEGER (1..8)     OPTIONAL -- Need OP
    },
    p-Max                             P-Max                  OPTIONAL,-- Need OP
    freqBandIndicator                 FreqBandIndicator,
    schedulingInfoList                SchedulingInfoList,
    tdd-Config                        TDD-Config             OPTIONAL,-- Cond TDD
    si-WindowLength                   ENUMERATED {
                                        ms1, ms2, ms5, ms10, ms15, ms20,
                                        ms40},
    systemInfoValueTag                INTEGER (0..31),
    nonCriticalExtension              SystemInformationBlockType1-v890-IEs
                                                             OPTIONAL -- Need OP
}
```

Further information regarding SystemInformationBlockType1 radio signal is familiar to the person skilled in the art. This radio signal contains a parameter q-RxLevMinOffset, which is the parameter corresponding to the information element $Q_{rxlevminoffset}$ in 3GPP TS 36.304. The use of $Q_{rxlevminoffset}$ can be found in 3GPP TS 36.304, section 5.2.3.2 (Cell Selection Criterion).

The parameter q-RxLevMinOffset may be transferred to a user device in Idle mode through broadcast, or may be transferred to a user device in Connected mode through dedicated signaling. According to one embodiment the method of the present invention targets the transfer of the parameter q-RxLevMinOffset in Idle mode, having the effect that the parameter is automatically applicable for all user devices that are in Idle mode.

By using one of the above offset values between a control node and an eNodeB, this has advantages over simply providing an absolute threshold value per se, since this allows other nodes of the network (such as other eNodeBs) to use an absolute threshold value for various other purposes (e.g. standard operation). This removes the burden on a control node, such as an MME or OSS-BSS, having to synchronise these aspects between eNodeBs.

The eNodeB can be configured to ensure that the q-RxLevMinOffset that results from the addition/subtraction or multiplication, remains within the value boundary that is specified for this parameter.

Figure 11:
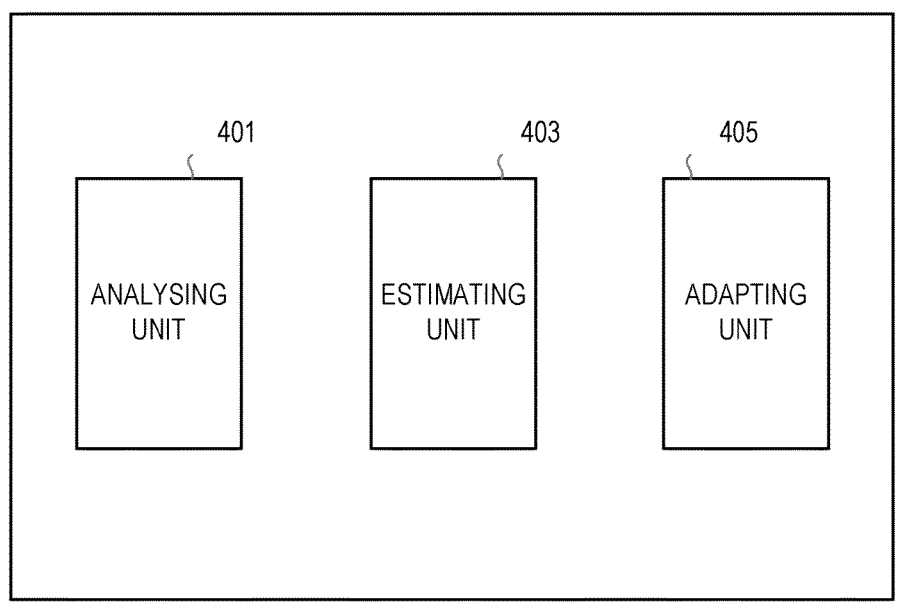
FIG. 11 is a block diagram illustrating a schematic embodiment of a node of a mobile network.

FIG. 11 shows a system 400 for controlling congestion in a cell of a mobile communications network, the mobile communications network comprising a plurality of cells for communicating with user devices. The system comprises an analysing unit 401 adapted to analyse, over a period of time, the load in a group of neighboring cells forming a subset of the plurality of cells. An estimating unit 403 is adapted to estimate a movement path of a cluster of user devices based on the analysis of the load in the group of neighboring cells. An adapting unit 405 is configured to adapt the size of one or more cells along the estimated movement path.

The adapting unit 405 may form part of a control node of the system, such as a MME or OSS-BSS. The adapting unit can be configured to reduce the size of at least one cell along the estimated movement path by adjusting a threshold level relating to a signal power level at which one or more user devices of a particular cell should initiate handover to a neighboring cell.

In one embodiment, the adapting unit 405 is configured to control the size of a cell which is currently closer to the cluster of user devices to be smaller than the size of a cell which is currently further away from the cluster of user devices along the estimated movement path.

In another embodiment the adapting unit 405 is configured to increase the size of one or more cells adjacent to a cell that is being reduced in size along the estimated movement path, and/or increase the size of one or more cells in the wake of an observed movement path of the cluster of user devices, wherein the size of a cell is increased by adjusting a threshold level relating to a signal power level at which one or more user devices of a particular cell should initiate handover to a neighboring cell.

The adapting unit 405 may be configured to communicate to a user device that an adjusted signal power level should be used as the signal power level at which handover to a neighboring cell should be initiated. This may involve transmitting an offset value to a base station associated with a cell whose size is to be artificially reduced or increased, such that the base station can communicate an adjusted threshold value to one or more user devices within that cell.

The adapting unit 405 can be configured to reduce the size of a cell in response to a predetermined portion of a cluster of user devices moving into that cell, and artificially increase the size of a cell in response to a predetermined portion of a cluster of user devices moving out of that cell.

The adapting unit 405 can be configured to reduce the size of a cell prior to a predetermined portion of a cluster of user devices moving into that cell, based on the estimated movement path, and increase the size of a cell in response to a predetermined portion of a cluster of user devices moving out of that cell.

As mentioned above, each cell may comprise a plurality of sectors, in which case the adapting unit 405 is configured to artificially reduce the size of a cell by reducing the size of one or more sectors within the cell, and artificially increase the size of one or more neighboring cells by increasing the size of one or more sectors of the respective one or more neighboring cells.

Figure 12:
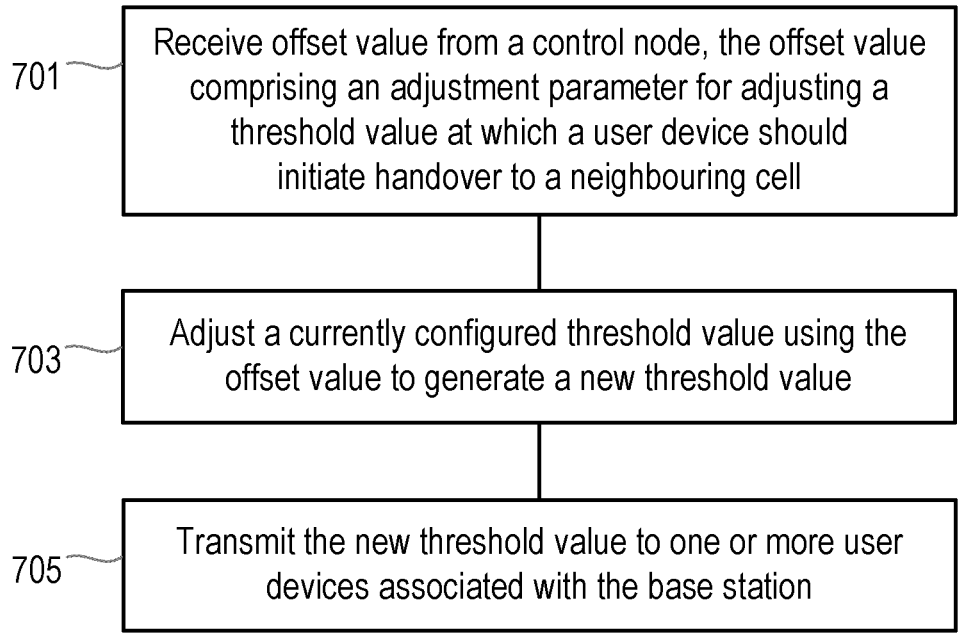
FIG. 12 is a flow chart illustrating a schematic embodiment of the method steps.

A base station node, for example an eNodeB in an LTE network, can perform the steps shown in FIG. 12. The method performed in a base station comprises the step of receiving an offset value from a control node, the offset value comprising an adjustment parameter for adjusting a threshold value at which a user device should initiate handover to a neighboring cell, step 701. A currently configured threshold value is adjusted using the offset value to generate anew threshold value, step 703. The new threshold value is transmitted to one or more user devices associated with the base station node, step 705.

The step of transmitting the new threshold value may comprise the step of transmitting the new threshold value using a System Information Block, SIB, message, to a user device (for example the parameter q-RxLevMinOffset of 3GPP TS 36.304).

The new threshold value (q-RxLevMinOffset) may be transferred to a user device during an Idle mode of operation using a broadcast signal, or during a Connected mode of operation using dedicated signalling.

The new threshold value may be transmitted to one or more selected user devices only. For example, the new threshold value may be transmitted to user devices having high-bandwidth usage in the first instance, so that congestion in a particular cell can be alleviated more easily, for example by affecting fewer user devices. An advantage of being able to send the new threshold values to specific user devices (e.g. high bandwidth devices), is that this enables the system to pre-emptively move selected subscribers to one or more adjacent cells, e.g. subscribers that have high bandwidth usage.

Figure 13:
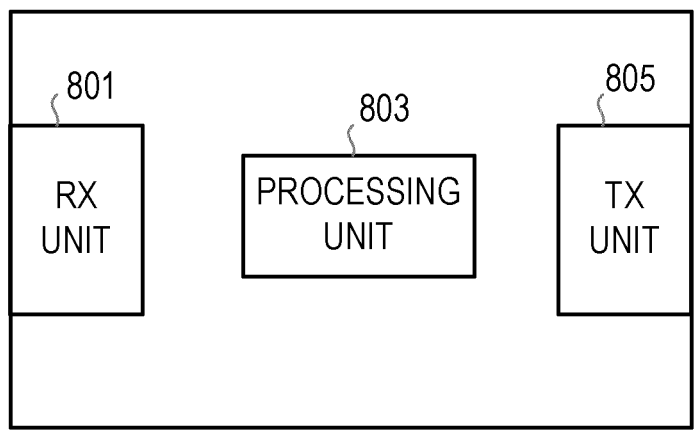
FIG. 13 is a block diagram illustrating a schematic embodiment of a node of a mobile network.

FIG. 13 shows a base station node 800 for a mobile communications network. The base station node 800 comprises a receiving unit 801 for receiving an offset value from a control node, the offset value comprising an adjustment parameter for adjusting a threshold value at which a user device is to initiate handover to a neighboring cell. A processing unit 803 is adapted to adjust a currently configured threshold value using the offset value to generate a new threshold value. A transmitting unit 805 is adapted to transmit the new threshold value to one or more user devices associated with the base station node.

The transmitting unit 805 may be adapted to transmit the new threshold value using a System Information Block (SIB) message, for example, to a user device, for example using the q-RxLevMinOffset parameter of 3GPP TS 36.304.

The transmitting unit 805 may be adapted to transmit the new threshold value (q-RxLevMinOffset) using a broadcast signal when a user device is in an Idle mode, or using dedicated signalling when a user device is in a Connected mode of operation.

According to another aspect of the invention there is provided a computer program product for running on a processor of a control node for controlling congestion in a cell of a mobile communications network, the mobile communications network comprising a plurality of cells for communicating with user devices. The computer program product is configured to perform the steps of: analysing over a period of time the load in a group of neighboring cells, the group of neighboring cells forming a subset of the plurality of cells; estimate a movement path of a cluster of user devices based on the analysis of the load in the group of neighboring cells; and adapt the size of one or more cells along the estimated movement path to control congestion in one or more cells.

According to another aspect of the invention there is provided a computer program product for running on a processor of a base station for controlling congestion in a cell of a mobile communications network, wherein the communications network comprises a plurality of cells, and wherein the communications network comprises a threshold value relating to a signal power level at which a user device is to initiate handover to an adjacent cell from a current cell. The computer program product is configured to perform the steps of: receiving an offset value from a control node, the offset value comprising an adjustment parameter for adjusting a threshold value at which a user device should initiate handover to a neighboring cell; adjusting a currently configured threshold value using the offset value to generate anew threshold value; and transmitting the new threshold value to one or more user devices associated with the base station node.

According to another aspect of the invention there is provided a terminal for controlling congestion in a cell of a mobile communications network, the mobile communications network comprising a plurality of cells for communicating with user devices. Referring back to FIG. 3, the terminal comprises: an analysing module 301 for analysing over a period of time the load in a group of neighboring cells, the group of neighboring cells forming a subset of the plurality of cells; an estimating module 303 for estimating a movement path of a cluster of user devices based on the analysis of the load in the group of neighboring cells; and an adapting module 305 for adapting the size of one or more cells along the estimated movement path to control congestion in one or more cells.

According to another aspect of the invention there is provided a terminal for controlling congestion in a cell of a mobile communications network, wherein the communications network comprises a plurality of cells, and wherein the communications network comprises a threshold value relating to a signal power level at which a user device should initiate handover to an adjacent cell. Referring back to FIG. 12, the terminal comprises a receiving module 701 for receiving an offset value from a control node, the offset value comprising an adjustment parameter for adjusting a threshold value at which a user device should initiate handover to a neighboring cell; an adjusting module 703 for adjusting a currently configured threshold value using the offset value to generate anew threshold value; and a transmitting module 705 for transmitting the new threshold value to one or more user devices associated with the terminal.

In addition to artificially decreasing the size of a cell or sector through broadcasting an adapted cell reselection offset value, the cells/sectors along the path may be configured to pre-emptively move individual subscribers to an adjacent cell. For example, individual subscribers or user devices that are currently engaged in bandwidth-intensive data transmission can be moved to an adjacent cell, by providing, through dedicated signaling, an adapted cell reselection offset value to those specific subscribers. In other words, the threshold value used by such user devices for initiating a handover to another cell can be specifically targeted to these devices, such that the high-bandwidth usage devices are effectively handed over to a neighboring cell. In such an embodiment a control node such as an OSS-BSS entity can pre-emptively provide a policy to the eNodeB(s) along the estimated movement path, to move subscribers whose bandwidth usage exceeds a certain threshold to an adjacent cell.

The embodiments of the invention as described herein have an advantage in that a section of users from a particular cell can be offloaded to one or more adjacent cells, for example in a situation where a particular cell is experiencing (e.g. temporarily) a high traffic load, or where a cell is estimated to shortly experience a high-load based on an estimated movement path. The net result is improved distribution of traffic load over adjacent cells, which reduces the chance of call failure or call drop due to high usage in one cell (eNodeB). An operator may in this manner improve overall E-UTRAN capacity, without investing in additional eNodeB traffic capacity or back-end transmission capacity.

When referring to a cluster of user devices, it is noted that the members of the cluster is not fixed (whether these be by class or number of user devices), and can comprise different classes of user devices or a different number of user devices at any moment in time. A cluster of user devices is therefore a body of user devices which is large enough to likely cause congestion problems if such a cluster were to build up within a particular cell, or move into another cell. The size of a cluster can therefore depend on a particular application. For example, a small number of high-bandwidth user devices may cause the same congestion problem as a large number of low-bandwidth user devices.

Examples of clusters of user devices include scenarios such as a crowd of people moving to or from a common destination, such as a concert or sporting event, or a crowd of people arriving in one location from a train. It is noted that the movement of clusters of user devices are not limited to such examples, and are intended to include any form of movement of user devices.

In the embodiments described above the term "artificial", when used to describe a cell size being reduced or increased in size, is performed without changing power levels of a eNodeB, but instead by adapting a threshold level at which one or more user devices should initiate handover.

Thus, the artificial cell size adaptation techniques described in the embodiments above, in which a portion of user devices receive an adjusted threshold level (i.e. the portion within a certain distance of an adjacent cell), will cause handover to be initiated sooner when a cell is artificially reduced in size, or later when a cell is artificially increased in size. This technique avoids having to change the power levels of cells in order to change the cell sizes (since such power level techniques would have disadvantageous effects on matters such as frequency re-use).

When cells are reduced in size along an estimated movement path, one or more neighboring cells can be increased in size as a result of the threshold level for handover being changed in these cells. These adjacent cells can be cells to either side, for example in a generally orthogonal direction, to the estimated movement path.

In the embodiments above, references to initiating a handover are intended to embrace a handover operation when engaged in a communication session, or a location update when not engaged in a communication session.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The embodiments of the invention have the advantage of preventing congestion in cells of a communication network. The embodiments of the invention have the advantage of being able to take pre-emptative action to prevent such congestion. The embodiments of the invention also enable such measures to be effected without having any undesired effects on other aspects of the network, for example without affecting frequency re-use techniques.

The invention claimed is:

1. A method, performed in a control node, of controlling congestion in a cell of a mobile communications network, the mobile communications network comprising a plurality of cells for communicating with user devices, the method comprising:

analyzing, over a period of time, the load in a group of neighboring cells, the group of neighboring cells forming a subset of the plurality of cells;
estimating a movement path of a cluster of user devices based on the analysis of the load in the group of neighboring cells; and
adapting a size of one or more cells along the estimated movement path to control congestion in one or more cells;
wherein the adapting the size of one or more cells along the estimated movement path comprises reducing the size of at least one cell along the estimated movement path by adjusting a threshold level relating to a signal power level at which one or more user devices of a particular cell should initiate handover to a neighboring cell.

2. The method of claim 1, further comprising controlling the size of a cell which is currently closer to the cluster of user devices to be smaller than the size of a cell which is currently further away from the cluster of user devices along the estimated movement path.

3. The method of claim 1,
wherein the adapting the size of one or more cells along the estimated movement path further comprises increasing the size of a further one or more cells by adjusting a threshold level relating to a signal power level at which one or more user devices of a further particular cell should initiate handover to a further neighboring cell, the further one or more cells being at least one of:
adjacent to a cell that is being reduced in size along the estimated movement path;
in the wake of an observed movement path of the cluster of user devices.

4. The method claim 1, wherein the adjusting the threshold level further comprises transmitting an offset value to a base station associated with a cell whose size is to be reduced or increased, such that the base station is enabled to:
adjust a currently configured threshold value to generate a new threshold value, and communicate the new threshold value to one or more user devices within that cell.

5. The method of claim 1, wherein a base station node of the network:
receives an offset value from a control node, the offset value comprising an adjustment parameter for adjusting a threshold value at which a user device should initiate handover to a neighboring cell;
adjusts a currently configured threshold value using the offset value to generate a new threshold value; and
transmits the new threshold value to one or more user devices associated with the base station node.

6. The method of claim 5, wherein the offset value comprises:
a positive or negative integer value to be added to or subtracted from, respectively, a currently configured threshold value to generate a new threshold value; or
a resize factor to be multiplied with a currently configured threshold value to generate a new threshold value.

7. A system for controlling congestion in a cell of a mobile communications network, the mobile communications network comprising a plurality of cells for communicating with user devices, the system comprising a control node, the control node comprising:
a processor;
memory containing instructions executable by the processor whereby the processor is configured to:
analyze, over a period of time, the load in a group of neighboring cells forming a subset of the plurality of cells;
estimate a movement path of a cluster of user devices based on the analysis of the load in the group of neighboring cells; and
adapt a size of one or more cells along the estimated movement path by adjusting a threshold level relating to a signal power level at which one or more user devices of a particular cell should initiate handover to a neighboring cell.

8. The system of claim 7, wherein to adapt the size of one or more cells along the estimated movement path, the processor is further configured to increase the size of one or more cells by adjusting a threshold level relating to a signal power level at which one or more user devices of a further particular cell should initiate handover to a further neighboring cell, the further one or more cells being at least one of:
a cell that is being reduced in size along the estimated movement path, and/or
in the wake of an observed movement path of the cluster of user devices.

9. The system of claim 7, further comprising a base station node, wherein the base station node comprises:
a further processor and a further memory, the further memory containing instructions executable by the further processor whereby the further processor is configured to:
receive an offset value from a control node, the offset value comprising an adjustment parameter for adjusting a threshold value at which a user device should initiate handover to a neighboring cell;
adjust a currently configured threshold value using the offset value to generate a new threshold value; and
transmit the new threshold value to one or more user devices associated with the base station node.

10. The system of claim 9, wherein the offset value comprises:
a positive or negative integer value to be added to or subtracted from, respectively, a currently configured threshold value to generate a new threshold value; or
a resize factor to be multiplied with a currently configured threshold value to generate a new threshold value.

11. A in a non-transitory computer readable medium storing computer program product for controlling congestion in a cell of a mobile communications network, the mobile communications network comprising a plurality of cells for communicating with user devices, the computer program product comprising software instructions which, when run on a processor of a control node, causes the control node to:
analyze, over a period of time, the load in a group of neighboring cells, the group of neighboring cells forming a subset of the plurality of cells;
estimate a movement path of a cluster of user devices based on the analysis of the load in the group of neighboring cells; and
adapt a size of one or more cells along the estimated movement path to control congestion in one or more cells;
wherein the adapting the size of one or more cells along the estimated movement path comprises reducing the size of at least one cell along the estimated movement path by adjusting a threshold level relating to a signal power level at which one or more user devices of a particular cell should initiate handover to a neighboring cell.

12. A terminal for controlling congestion in a cell of a mobile communications network, the mobile communications network comprising a plurality of cells for communicating with user devices, the terminal comprising:
a processor;
memory containing instructions executable by the processor whereby the terminal is operative to:
analyze, over a period of time, the load in a group of neighboring cells, the group of neighboring cells forming a subset of the plurality of cells;
estimate a movement path of a cluster of user devices based on the analysis of the load in the group of neighboring cells; and
adapt a size of one or more cells along the estimated movement path to control congestion in one or more cells;
wherein the adapting the size of one or more cells along the estimated movement path comprises reducing the size of at least one cell along the estimated movement path by adjusting a threshold level relating to a signal power level at which one or more user devices of a particular cell should initiate handover to a neighboring cell.

* * * * *